United States Patent
Legiret et al.

(10) Patent No.: US 6,579,088 B2
(45) Date of Patent: Jun. 17, 2003

(54) STABILIZED-FLAME AEROGAS/OXYGAS BURNER AND QUARL BLOCK FITTED WITH SUCH A BURNER

(75) Inventors: Thierry Legiret, Paris (FR); Gérard Le Goueffec, Paris (FR); Stéphane Arnoux, Paris (FR); Thierry Borissoff, Paris (FR); Dominique Robillard, Paris (FR)

(73) Assignee: L'Air Liquide Societe Anonyme a Directoire et Conseil de Surveillance pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/761,848

(22) Filed: Jan. 18, 2001

(65) Prior Publication Data

US 2002/0192613 A1 Dec. 19, 2002

(30) Foreign Application Priority Data

Feb. 1, 2000 (FR) .............................. 00 01250

(51) Int. Cl.⁷ ................................. F23C 5/08

(52) U.S. Cl. ................... 431/181; 431/159; 431/187

(58) Field of Search ............................ 431/181, 186, 431/187, 154, 189, 151, 155, 159, 10; 239/422, 423

(56) References Cited

U.S. PATENT DOCUMENTS

| | | | |
|---|---|---|---|
| 3,086,582 A | * 4/1963 | Kinney | 431/187 |
| 3,133,731 A | * 5/1964 | Reed | 431/187 |
| 4,431,403 A | 2/1984 | Nowak et al. | |
| 5,217,363 A | 6/1993 | Brais et al. | |
| 5,611,683 A | * 3/1997 | Baukal, Jr. et al. | 431/187 |
| 5,772,427 A | * 6/1998 | Laurenceau et al. | 431/181 |
| 5,871,343 A | 2/1999 | Baukal, Jr. et al. | |
| 6,416,317 B1 | * 7/2002 | Arnoux et al. | 431/181 |

FOREIGN PATENT DOCUMENTS

EP 0 921 350 6/1999

* cited by examiner

Primary Examiner—James C. Yeung
(74) Attorney, Agent, or Firm—Burns, Doane, Swecker & Mathis, L.L.P.

(57) ABSTRACT

Provided is a burner which includes a pipe having a free end region designed to be housed in a furnace quarl. The pipe includes one or more fuel feed ducts surrounded over part of their length by a sheath which defines an oxidizer feed channel and is fastened to a flange. A jacket is disposed around at least part of the length of the end region so as itself to be housed in the quarl and to define a feed channel for a second oxidizer between the jacket and the internal wall of the quarl. The jacket is fastened to a flange for securing to the quarl and the flange for the sheath is fastened to that for the jacket. The burner has particular applicability in industrial furnaces, especially for melting non-ferrous materials, for reheating or for annealing.

20 Claims, 2 Drawing Sheets

STABILIZED-FLAME AEROGAS/OXYGAS BURNER AND QUARL BLOCK FITTED WITH SUCH A BURNER

BACKGROUND OF THE INVENTION

1. Field of the Invention

The present invention relates to air-fuel and/or oxygen-fuel burners intended to be fitted into industrial furnaces, especially furnaces for melting, for example, non-ferrous metals (aluminum, copper, lead, etc.), reheat furnaces, annealing furnaces, or furnaces intended for preheating ladles, and in general to burners intended for so-called "low temperature" melting or heating applications. The industrial furnaces of the present invention may be used in applications at a temperature lying within a range extending from approximately 500° C. to 1500° C.

The invention also relates to the quarl blocks fitted with such a burner.

2. Description of the Related Art

To obtain optimum, uniform and economic heating requires the formation of a stable flame. The emission of nitrogen oxides, which are extremely harmful, also needs to be reduced.

Techniques are already known which aim to stabilize the flame in air-fuel fired operation and/or to reduce emissions of nitrogen oxides.

For example, document EP 0 644 374, which recommends rotating the injected air, describes a complex assembly of metal mechanical parts whose operation within the temperature range indicated above results in relatively rapid wear, requiring the worn parts to be periodically replaced.

Document EP 0 757 205 recommends the injection of a jet of air at an angle which takes this jet away from the first oxygen-fuel combustion zone, thus creating a recirculation zone in a refractory block. The fact that the jet of air is directed away from the jet of oxygen is not generally something which makes it easy to obtain a stable flame. Furthermore, it appears to be difficult to make a burner equipped in this way operate, as required, in oxy-fuel mode or in air-fuel mode.

Document U.S. Pat. No. 4,797,087 recommends the staging of the combustion, namely the creation of a fuel-rich first mixture followed by the injection of a second oxidizer into a second mixing zone. However, the range of working temperatures is markedly higher than that intended by the invention and the subject-matter of that document does not seem to lend itself to purely oxy-fuel operation.

SUMMARY OF THE INVENTION

The object of the invention is to remedy the drawbacks of the known techniques and to create an air-fuel/oxy-fuel burner which produces a stable flame, is of simple construction, is reliable, has small dimensions and is capable of working, as required, either in oxy-fuel mode or in virtually wholly air-fuel mode.

For this purpose, the invention relates to an air-fuel or oxy-fuel burner including a pipe having a free end region designed to be housed in a quarl of an industrial furnace, this pipe having at least one fuel feed duct; a sheath surrounding the duct or ducts over part of their length in order to define a first oxidizer feed channel between the sheath and the duct; a sheath flange extending transversely around the sheath; a jacket fitted around the sheath and disposed around at least part of the length of the free end region of the pipe, the sheath designed to be housed in the quarl and to define a second oxidizer feed channel between the jacket and the inner surface of the quarl; and a jacket flange extending transversely around the jacket for securing the jacket to the quarl and the sheath flange being fastened to the jacket flange.

By virtue of this structure, an air-fuel and/or oxy-fuel burner is obtained which is simple to manufacture, occupies little space and is easy to fit.

The burner may furthermore have one or more of the following characteristics:

each fuel feed duct comprises an injector provided at a free end of a rigid conduit, and the actual free end of the injector constitutes the free end of the duct;

the jacket is fitted around the sheath;

the jacket extends beyond the sheath, approximately so as to be in line with the free end of the fuel feed duct or ducts, in order to define, between the jacket and the ducts, an oxygen feed channel extending as far as the free end;

the jacket has a smaller cross section than that of the sheath starting from a region lying slightly beyond the free end of the sheath;

the flange for the jacket carries studs for fastening the flange for the sheath;

the pipe has a longitudinal axis with respect to which the sheath is off-centered in order to leave, between the sheath and the fuel feed duct or ducts, a wider space on one side in order to accommodate a tube for a flame control device and a pilot burner;

the sheath has a part of flared shape and one end of an oxygen feed tube emerges in this flared part;

the flange for the jacket has an opening in which one end of the a feed tube for the second oxidizer emerges;

the velocity of the fuel in the fuel feed duct or ducts lies within a range of approximately 10 m/s to 180 m/s;

oxygen flows in the first oxidizer feed channel at a velocity at most equal to approximately 20 m/s and preferably equal to approximately 8 m/s; and natural gas flows in the fuel feed duct or ducts with a total flow rate of approximately 50 $Sm^3/h$ and at a velocity of approximately 30 m/s and oxygen flows in the first oxidizer feed channel with a flow rate of approximately 100 $Sm^3/h$ and at a velocity of approximately 8.5 m/s.

The invention also relates to a quarl block fitted with a burner as defined above, comprising a quarl passing right through the quarl block and having an inlet chamber and an outlet chamber which are joined by a transition zone flared towards the inlet chamber, and the fuel feed duct or ducts of the pipe of the burner penetrate, from the inlet chamber, right into the outlet chamber.

The quarl block may also have one or more of the following characteristics:

in the case in which the outlet chamber is approximately cylindrical, the distance L between the free end of the fuel feed ducts and the end of the quarl located on the internal side of the furnace and the diameter d of the outlet chamber satisfy the relationship $0.3d \leq L \leq 1.8d$;

the inlet chamber is off-centered with respect to a longitudinal axis of the pipe and with respect to the outlet chamber and the transition zone, in order to leave a wider space between the inner surface of the quarl and the jacket allowing the introduction of the second oxidizer;

the oxidizer feed channel is designed for an oxygen stream to flow in it, the feed channel for a second oxidizer is designed for a stream of air to flow in it and the fuel feed duct or ducts are designed for a stream of natural gas to flow in them;

oxygen flows in the oxidizer feed channel with a flow rate lying within a range going from approximately 1% to 5% of the total (oxygen, air and fuel) flow rate;

air flows in the feed channel for a second oxidizer at a velocity at most equal to approximately 50 m/s and preferably equal to approximately 30 m/s;

natural gas flows in the fuel feed duct or ducts with a total flow rate of approximately 50 $Sm^3/h$ and at a velocity of approximately 30 m/s, oxygen flows in the oxidizer feed channel with a flow rate of approximately 50 $Sm^3/h$ and at a velocity of approximately 4.25 m/s and air flows in the feed channel for a second oxidizer with a flow rate of approximately 250 $Sm^3/h$ and at a velocity of approximately 13.4 m/s; and natural gas flows in the fuel feed duct or ducts with a total flow rate of approximately 50 $Sm^3/h$ and at a velocity of approximately 30 m/s, oxygen flows in the oxidizer feed channel with a flow rate of approximately 15 $Sm^3/h$ and at a velocity of approximately 1.3 m/s and air flows in the feed channel for a second oxidizer with a flow rate of approximately 427 $Sm^3/h$ and at a velocity of approximately 23 m/s.

By virtue of these characteristics, it is also possible to obtain a highly stable flame.

BRIEF DESCRIPTION OF THE DRAWINGS

Further features and advantages of the invention will become apparent from the description which follows of one embodiment of the invention given by way of non-limiting example and illustrated in the appended drawings in which.

DETAILED DESCRIPTION OF THE PREFERRED EMBODIMENTS OF THE INVENTION

Figure 1:
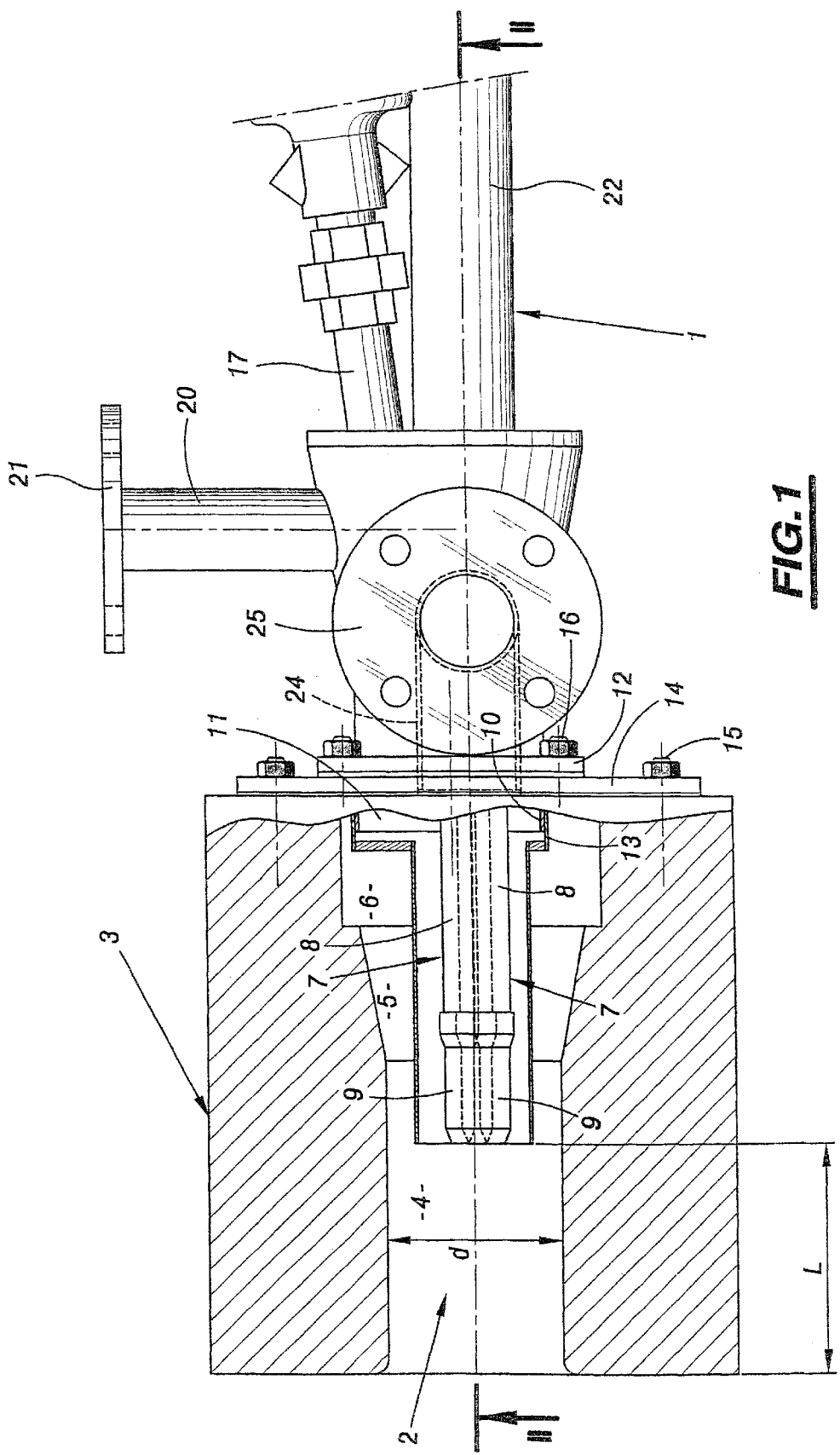
FIG. 1 is a top view, partially cut away on the line I—I in FIG. 2, of one embodiment of the invention, in which certain elements visible in FIG. 2 have not been shown so as not to clutter up the drawing.

The burner illustrated by the figures is an air-fuel/oxy-fuel burner including a pipe 1, one end region of which is housed in a quarl 2 hollowed out in a quarl block 3. The quarl is formed in an outer wall of an industrial furnace and passes right through the quarl block 3.

The quarl 2 has, going from the inside towards the outside of the furnace, three main zones: an outlet chamber 4 (which is cylindrical in this case) having, for example a length of about twenty centimeters and a height (in this case a diameter) of about ten centimeters, a zone 5 flared towards the outside of the furnace (in this case frustoconical), having a length of about ten centimeters, and an inlet chamber 6 joined by the flared zone to the outlet chamber, having a length of about ten centimeters, and the geometry of which will be specified below.

In a known manner, the outlet chamber 4 of the quarl has a short flaring rounded edge where it intersects the furnace chamber. The smallest diameter of the flared zone is approximately equal to the diameter of the outlet chamber 4 and the flared zone has a slightly larger diameter at the intersection with the furnace chamber.

The pipe 1 includes one or more (in this case, three) fuel feed ducts 7, for example for natural gas. These feed ducts 7 consist of rigid conduits 8 whose free end is fitted with a nozzle or with an injector 9. The three ducts 7 are distributed, in cross section, at 120° about a longitudinal axis of the pipe 1. They extend into the quarl from the inlet chamber 6 as far as the outlet chamber 4. The ducts 7 extend into the block 3 to a depth which is slightly greater than about twenty centimeters if the block 3 has a thickness of about forty centimeters. Additional information in this regard will be given later.

The pipe 1 also includes a metal sheath or collar 10 surrounding the fuel feed ducts 7 over a part of their length in order to define, between the sheath and the ducts, an oxygen feed channel 11 for feeding the oxidizer for the burner into the quarl 2. Fastened to this sheath 10 is a flange 12 extending transversely around it. In the case of known oxy-fuel burners, the sheath 10 penetrates the inlet chamber to a depth of only a few centimeters and its flange 12 is fastened to the quarl block 3 of the furnace in that zone of the furnace which surrounds the quarl 2, for example by means of studs, one end of which is embedded in the block and an outwardly projecting threaded part of which, passing through the flange, is designed to take at least one nut. In this known burner, the oxygen feed channel beyond the sheath towards the inside of the furnace is defined between the internal surface of the quarl 2 and the ducts 7.

However, here, fitted around the sheath 10 is a metal jacket 13 extending towards the inside of the furnace beyond the sheath. The metal jacket 13 extends as far as approximately the free end of the ducts 7 so that, as far as this free end, the oxygen feed channel is defined between the jacket 13 and the ducts. The jacket 13 has a smaller cross section than that of the sheath 10 starting from a region lying slightly beyond the free end of the sheath 10 located in the inlet chamber. Since the cross-sectional dimensions of the quarl 2 are greater than those of the jacket 13 over the entire length of the jacket, an additional channel is defined between the internal surface of the quarl and the jacket. This channel is used for feeding a second oxidizer, namely air, into the outlet chamber of the quarl.

Fastened to the jacket 13 is a flange 14 extending transversely around it. In fact, here, it is not the flange 12 for the sheath that is fastened to the block 3 in that zone of the block surrounding the quarl, but the flange 14 for the jacket 13 forming the partition between the oxygen feed channel and the air feed channel. The flange 14 for the jacket 13 is therefore fastened to the block, for example by means of studs 15, one end of which is embedded in the block 3 and an outwardly projecting threaded part of which, passes through the flange 14 and is designed to take at least one nut. The flange 14 for the jacket 13 itself has studs 16, an outwardly projecting threaded part of which passes through the flange 12 for the sheath 10 in order to take at least one nut, so as to secure the two flanges 12, 14 together. Seals may be interposed between the block 3 and the flange 14 for the jacket 13 and between the flange 14 for the jacket and the flange 12 for the sheath 10, respectively.

Figure 2:
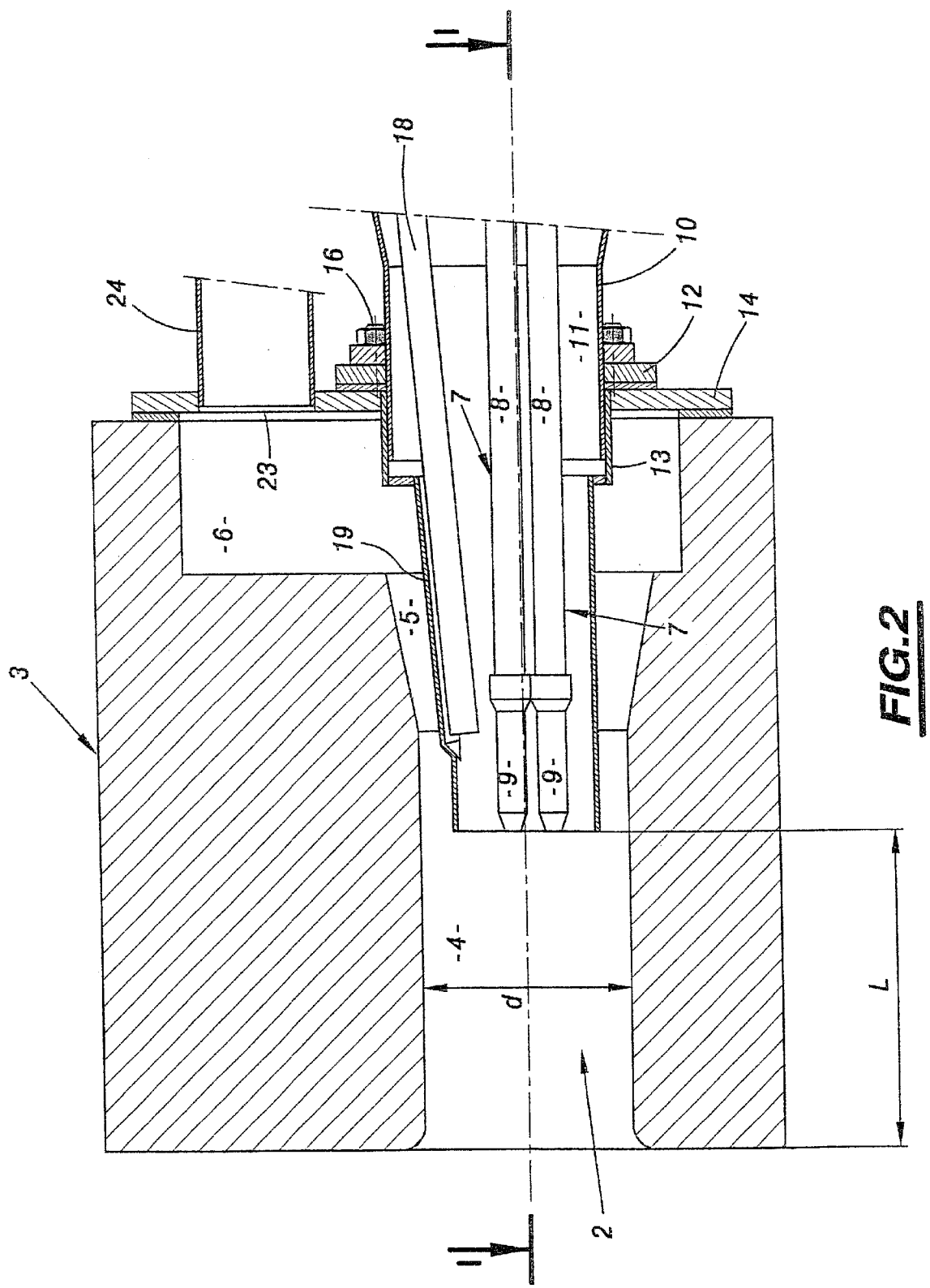
FIG. 2 is a longitudinal section on the line II—II in FIG. 1 of one embodiment of the invention, in which certain elements visible in FIG. 1 have not been shown so as not to clutter up the drawing.

As may be seen in the figures, the longitudinal axis of the pipe 1, defined above as being the axis around which the fuel feed ducts 7 are distributed, is centered in the outlet chamber 4 and in the flared transition zone 5 between the outlet chamber 4 and the inlet chamber 6 of the quarl, but the sheath 10 is off center with respect to this axis in order to leave, between it and the fuel feed ducts, a wider space on one side. As shown in FIG. 1, this space allows for a tube 17 belonging to a flame control device allowing control from outside the furnace. As shown in FIG. 2 another portion of the space allows for a pilot burner 18, the free end of which emerges near that of the fuel feed ducts 7. The jacket 13 has a recess 19 (FIG. 2) converging towards the longitudinal axis of the pipe towards the inside of the furnace in order to provide a passage for the pilot burner 18 and to house it. Outside the block 3, the sheath 10 has a part which is flared radially outward moving away from the block and one end of an oxygen feed tube 20 emerges in this flared part of the sheath on the same side as the wider space left by the offcentring. The opposite end of the oxygen feed tube 20 is provided with a fastening flange 21 for a corresponding flange on an oxygen feed line. The tube 20 lies, outside the sheath 10, approximately at right angles to the longitudinal axis of the pipe 1. The fuel feed ducts 7 are connected, inside the sheath 10, to a fuel feed tube 22 lying along and centered on the longitudinal axis of the pipe. The fuel feed tube 22 is intended to be connected to a fuel feed line.

The inlet chamber 6 of the quarl is itself off-centered with respect to the longitudinal axis of the pipe 1 and thus with respect to the outlet chamber 4 and the transition zone 5 in order to leave a wider space between the internal surface of the quarl and the jacket 13 to allow the introduction of air. For this purpose, the flange 14 for the jacket 13 has, in a region covering this wider space, an opening 23 in which one end of an air feed tube 24 emerges, only a short section of which tube 24 is shown in FIG. 2. As shown in FIG. 1, the air feed tube 24 is bent at a right angle and its opposite end is provided with a fastening flange 25 for a corresponding flange on an air feed line.

The burner shown in FIGS. 1 and 2 which results from the addition, to a known oxy-fuel burner, of an air injection part which is housed in the quarl block 2 and has a metal jacket 13 and a flange 14 for fastening to this block, the flange 12 for the collar 10 of the burner being fastened to the flange of the jacket 13, offers various possible ways of stabilizing the flame.

A first way, in air-fuel operation, involves delivering oxygen at a flow rate lying within a range of approximately 1% to 5%, preferably approximately 3%, of the total flow rate entering the outlet chamber of the quarl.

Another way involves placing the free end of the fuel feed ducts 7, in this case the end of the injectors 9, relatively close to that end of the quarl 2 which is located on the inside of the furnace. When the outlet chamber 4 is approximately cylindrical, if L is the distance between free end of the fuel feed ducts and the end of the quarl and d is the diameter of the outlet chamber of the quarl, it is estimated that this condition is fulfilled if $0.3d \leq L \leq 1.8d$.

The velocity of the fuel, for example natural gas, lies approximately within the range from 10 m/s to 180 m/s, depending on the maximum power desired.

The velocity of the oxygen is at most equal to approximately 20 m/s, preferably approximately 8 m/s.

The velocity of the air is at most equal to approximately 50 m/s, preferably approximately 30 m/s.

Under these conditions, it is not necessary to make the air swirl or to inject divergent jets of air. Much more simply, the invention allows a flame to be created from a fuel and from one or two oxidizers that are injected in the same direction, more specifically in this case coaxially.

The drawings correspond to a burner having a unit power of about 500 kW by virtue of the combustion of approximately 50 $Sm^3/h$ of natural gas with either approximately 100 $Sm^3/h$ of oxygen or a maximum of approximately 500 $Sm^3/h$ of air and, optionally, a flow rate of pure oxygen lying within a range of approximately 2% to 5%.

Various examples of the operation of this burner are illustrated by the table below, for a power of 500 kW and a flow rate of natural gas of 50 $Sm^3/h$ at a velocity of 30 m/s.

|  | Air flow rate $Sm^3/h$ | Oxygen flow rate $Sm^3/h$ | Air velocity m/s | Oxygen velocity m/s |
| --- | --- | --- | --- | --- |
| All oxygen | 0 | 100 | 0 | 8.5 |
| Mixed | 250 | 50 | 13.4 | 4.25 |
| All air (almost) | 427 | 15 | 23 | 1.3 |

Of course, the invention is not limited to the embodiments described and illustrated above and it would be possible to provide other embodiments without departing from the scope of the invention.

What is claimed is:

1. An air-fuel and/or oxygen-fuel burner comprising:

pipe having a free end region designed to be housed in a quarl of an industrial furnace, the pipe having at least one fuel feed duct;

a sheath surrounding the at least one duct over part of its length to define a first oxidizer feed channel between the sheath and the duct;

a sheath flange extending transversely around the sheath;

a jacket disposed around at least part of the length of the free end region of the pipe, the sheath designed to be housed in the quarl and to define a second oxidizer feed channel between the jacket and the inner surface of the quarl; and a jacket flange extending transversely around the jacket for securing the jacket to the quarl, and the sheath flange being fastened to the jacket flange.

2. The burner according to claim 1, wherein each of the at least one fuel feed ducts comprises an injector provided at a free end of a rigid conduit and the actual free end of the injector constituting the end of the duct.

3. The burner according to claim 1, wherein the jacket is fitted around the sheath.

4. The burner according to claim 1, wherein the jacket extends beyond the sheath, approximately so as to be in line with the free end of the at least one fuel feed duct, to define, between the jacket and the duct, an oxygen feed channel extending as far as the free end.

5. The burner according to claim 1, wherein the jacket has a smaller cross section than that of the sheath starting from a region lying slightly beyond the free end of the sheath.

6. The burner according to claim 1, wherein the jacket flange carries studs for fastening the sheath flange.

7. The burner according to claim 1, wherein the pipe has a longitudinal axis with respect to which the sheath is offcentered to leave, between the sheath and the at least one fuel feed duct, a wider space on one side to accommodate a tube for a flame control device and a pilot burner.

8. The burner according to claim 1, wherein the sheath includes a part with a flared shape and one end of an oxygen feed tube connects to the sheath in the flared part.

9. The burner according to claim 1, wherein the flange for the jacket has an opening in which one end of a feed tube for the second oxidizer emerges.

10. The burner according to claim 1, wherein the velocity of the fuel in the at least one fuel feed duct lies within a range of approximately 10 m/s to 180 m/s.

11. The burner according to claim 1, wherein oxygen flows in the first oxidizer feed channel at a velocity at most equal to approximately 20 m/s.

12. The burner according to claim 1, wherein natural gas flows through the at least one fuel feed duct with a total flow rate of approximately 50 $Sm^3/h$ and a velocity of approximately 30 m/s, and oxygen flows in the first oxidizer feed channel at a flow rate of approximately 100 $Sm^3/h$ and a velocity of approximately 8.5 m/s.

13. A quarl block fitted with a burner according to claim 1, the quarl block comprising a quarl passing through the quarl block, and an inlet chamber and an outlet chamber which are joined by a transition zone flared towards the inlet chamber, wherein the at least one fuel feed duct penetrates, from the inlet chamber, into the outlet chamber.

14. The quarl block according to claim 13, wherein the outlet chamber is approximately cylindrical and the distance L between the free end of the at least one fuel feed duct and an end of the quarl located on the internal side of the furnace and the diameter of the outlet chamber satisfy the relationship $0.3d \leq L \leq 1.8d$.

15. The quarl block according to claim 13, wherein the inlet chamber is offcentered with respect to a longitudinal axis of the pipe and with respect to the outlet chamber and the transition zone, to leave a wider space between the inner surface of the quarl and the jacket allowing introduction of the second oxidizer.

16. The quarl block according to claim 13, wherein the first oxidizer feed channel is designed for an oxygen stream to flow therein, the second oxidizer feed channel is designed for a stream of air to flow therein and the at least one fuel feed duct is designed for a stream of natural gas to flow therein.

17. The quarl block according to claim 13, wherein oxygen flows in the first oxidizer feed channel with a flow rate in a range of from approximately 1% to 5% of the total oxygen, air and fuel flow rate.

18. The quarl block according to claim 13, wherein air flows in the second oxidizer feed channel at a velocity at most equal to approximately 50 m/s.

19. The quarl block according to claim 12, wherein natural gas flows in the at least one fuel feed duct with a total flow rate of approximately 50 $Sm^3/h$ and a velocity of approximately 30 m/s, oxygen flows in the first oxidizer feed channel with a flow rate of approximately 50 $Sm^3/h$ and a velocity of approximately 4.25 m/s, and air flows in the second oxidizer feed channel with a flow rate of approximately 250 $Sm^3/h$ and a velocity of approximately 13.4 m/s.

20. The quarl block according to claim 13, wherein natural gas flows in the at least one fuel feed duct with a total flow rate of approximately 50 $Sm^3/h$ and a velocity of approximately 30 m/s, oxygen flows in the first oxidizer feed channel with a flow rate of approximately 15 $Sm^3/h$ and a velocity of approximately 1.3 m/s and air flows in the second oxidizer feed channel with a flow rate of approximately 427 $Sm^3/h$ and a velocity of approximately 23 m/s.

* * * * *